US008629863B2

(12) United States Patent
Van Delden et al.

(10) Patent No.: US 8,629,863 B2
(45) Date of Patent: Jan. 14, 2014

(54) ELECTRONIC DEVICE USING MOVEMENT OF PARTICLES

(75) Inventors: Martinus Hermanus Wilhelmus Maria Van Delden, Eindhoven (NL); Franciscus Paulus Maria Budzelaar, Eindhoven (NL); Sander Jurgen Roosendaal, Brno (CZ)

(73) Assignee: Koninklijke Philips N.V., Eindhoven (NL)

( * ) Notice: Subject to any disclaimer, the term of this patent is extended or adjusted under 35 U.S.C. 154(b) by 531 days.

(21) Appl. No.: 12/515,810

(22) PCT Filed: Nov. 22, 2007

(86) PCT No.: PCT/IB2007/054747

§ 371 (c)(1),
(2), (4) Date: May 21, 2009

(87) PCT Pub. No.: WO2008/065589

PCT Pub. Date: Jun. 5, 2008

(65) Prior Publication Data

US 2010/0053135 A1 Mar. 4, 2010

(30) Foreign Application Priority Data

Nov. 28, 2006 (EP) .................................... 06124912

(51) Int. Cl.
*G06F 3/038* (2013.01)
*G09G 3/34* (2006.01)

(52) U.S. Cl.
USPC .............................. 345/208; 345/84; 345/107

(58) Field of Classification Search
USPC ................................................. 345/107, 208
See application file for complete search history.

(56) References Cited

U.S. PATENT DOCUMENTS

| | | | | |
|---|---|---|---|---|
| 6,538,801 | B2 | 3/2003 | Jacobson et al. | |
| 6,639,580 | B1 * | 10/2003 | Kishi et al. .................... | 345/107 |
| 2003/0081305 | A1 | 5/2003 | Chung et al. | |
| 2005/0035941 | A1 | 2/2005 | Albert et al. | |

(Continued)

FOREIGN PATENT DOCUMENTS

| | | | |
|---|---|---|---|
| WO | 02086612 | A1 | 10/2002 |
| WO | 2004066253 | A1 | 8/2004 |

(Continued)

OTHER PUBLICATIONS

Written Opinion of the International Searching Authority for International Application N No. PCT/IB2007/054747.

(Continued)

*Primary Examiner* — Alexander Eisen
*Assistant Examiner* — Amit Chatly

(57) ABSTRACT

A method is provided of driving an electronic device comprising an array of device elements, each device element comprising particles which are moved to control a device element state, and each device element comprising a collector electrode, and an output electrode. The method comprises: in a reset phase, applying a first set of control signals to control the device to move the particles to the a reset electrode; and in an addressing phase, applying a second set of control signals to control the device to move the particles from the reset electrode such that a desired number of particles are at the output electrode. The second set of control signals comprises a pulse waveform oscillating between first and second voltages in which the first voltage is for attracting the particles to the reset electrode and the second voltage is for attracting the particles from the reset electrode to the output electrode, and wherein the duty cycle of the pulse waveform determines the proportion of particles transferred to the output electrode in the addressing phase. This control method provides well-controlled packets of particles which are collected in a vortex at the reset electrode before being passed on, in part, towards the output electrode (for example via the gate electrode).

18 Claims, 6 Drawing Sheets

(56) References Cited

U.S. PATENT DOCUMENTS

2005/0270261 A1 * 12/2005 Danner et al. .................. 345/84
2006/0050362 A1 3/2006 Johnson et al.

FOREIGN PATENT DOCUMENTS

WO 2005071651 A1 8/2005
WO 2005093508 A1 10/2005

OTHER PUBLICATIONS

Bert et al: "14-1: Passive Matrix Addressing of Electrophoretic Image Display"; Eurodispolay, Oct. 1 2002, pp. 251-254.

* cited by examiner

ELECTRONIC DEVICE USING MOVEMENT OF PARTICLES

FIELD OF THE INVENTION

This invention relates to an electronic device using movement of particles. One example of this type of device is an electrophoretic display.

BACKGROUND OF THE INVENTION

Electrophoretic display devices are one example of bistable display technology, which use the movement of charged particles within an electric field to provide a selective light scattering or absorption function.

In one example, white particles are suspended in an absorptive liquid, and the electric field can be used to bring the particles to the surface of the device. In this position, they may perform a light scattering function, so that the display appears white. Movement away from the top surface enables the color of the liquid to be seen, for example black. In another example, there may be two types of particle, for example black negatively charged particles and white positively charged particles, suspended in a transparent fluid. There are a number of different possible configurations.

It has been recognized that electrophoretic display devices can enable low power consumption as a result of their bistability (an image is retained with no voltage applied), and they can enable thin and bright display devices to be formed as there is no need for a backlight or a polariser. They may also be made from plastic materials, and there is also the possibility of low cost reel-to-reel processing in the manufacture of such displays.

If costs are to be kept as low as possible, passive addressing schemes are employed. The most simple configuration of a display device is a segmented reflective display, and there are a number of applications where this type of display is sufficient. A segmented reflective electrophoretic display has low power consumption, good brightness and is also bistable in operation, and therefore able to display information even when the power source is turned off.

A known electrophoretic display using a passive matrix and using particles having a threshold comprises a lower electrode layer, a display medium layer accommodating particles having a threshold suspended in a transparent or colored fluid, and an upper electrode layer. Biasing voltages are applied selectively to electrodes in the upper and/or lower electrode layers to control the state of the portion(s) of the display medium associated with the electrodes being biased.

An alternative type of electrophoretic display device uses so-called "in-plane switching". This type of device uses movement of the particles selectively laterally in the display material layer. When the particles are moved towards lateral electrodes, an opening appears between the particles, through which an underlying surface can be seen. When the particles are randomly dispersed, they block the passage of light to the underlying surface and the particle color is seen. The particles may be colored and the underlying surface black or white, or else the particles can be black or white, and the underlying surface colored.

An advantage of in-plane switching is that the device can be adapted for transmissive operation, or transflective operation. In particular, the movement of the particles creates a passageway for light, so that both reflective and transmissive operation can be implemented through the material. This enables illumination using a backlight rather than reflective operation. The in-plane electrodes may all be provided on one substrate, or else both substrates may be provided with electrodes.

Active matrix addressing schemes are also used for electrophoretic displays, and these are generally required when a faster image update is desired for bright full color displays with high resolution greyscale. Such devices are being developed for signage and billboard display applications, and as (pixelated) light sources in electronic window and ambient lighting applications. Colors can be implemented using color filters or by a subtractive color principle, and the display pixels then function simply as greyscale devices. The description below refers to greyscales and grey levels, but it will be understood that this does not in any way suggest only monochrome display operation.

The invention applies to both of these technologies, but is of particular interest for passive matrix display technologies, and is of particular interest for in-plane switching passive matrix electrophoretic displays.

Electrophoretic displays are typically driven by complex driving signals. For a pixel to be switched from one grey level to another, often it is first switched to white or black as a reset phase and then to the final grey level. Grey level to grey level transitions and black/white to grey level transitions are slower and more complicated than black to white, white to black, grey to white or grey to black transitions.

Typical driving signals for electrophoretic displays are complex and can consist of different subsignals, for example "shaking" pulses aimed at speeding up the transition, improving the image quality, etc.

Further discussion of known drive schemes can be found in WO 2005/071651 and WO 2004/066253.

One significant problem with electrophoretic displays, and particularly passive matrix versions, is the time taken to address the display with an image. This addressing time results from the fact that the pixel output is dependent on the physical position of particles within the pixel cells, and the movement of the particles requires a finite amount of time. The addressing speed can be increased by various measures, for example providing pixel-by-pixel writing of image data which only requires movement of pixels over a short distance, followed by a parallel particle spreading stage which spreads the particles across the pixel area for the whole display.

Typical pixel addressing times range between several tens to hundreds of milliseconds for small-sized pixels in out-of-plane switching electrophoretic displays up to several minutes for larger-sized pixels in in-plane switching electrophoretic displays. Furthermore, the displacement speed of the particles scales with the applied field. Thus in principle, the higher the applied field, the faster a greyscale change can be achieved, and thus the shorter the image up-date time could be.

However, unfortunately, only at low and very low drive voltages can greyscale uniformity be obtained. Typically, irreproducible and non-uniform greyscales are obtained at the larger drive fields (~0.1-1 V/μm), or only a low number of shades of greyscales is obtained.

For example, at present the number of accurate (and reproducible) greyscales that can be achieved in commercially available products is just 4. This is unacceptable for e-books and e-signage, which are typically considered to require 4-6 bit greyscales. In general, the greyscale capability in electrophoretic displays depends on a number of critical parameters such as device history, pigment type and pigment non-uniformity, pixel size and pixel-to-pixel non-uniformity, cell-gap and cell-gap non-uniformity, pixel contaminants, temperature effects, pixel design, such as electrode layout, topography, geometry and device operation (drive schemes, addressing cycles/sequences, DC-balancing).

SUMMARY OF THE INVENTION

This invention is based on the recognition that there is another, and very significant, reason for the limited greyscale capability of current electrophoretic display designs, due to a phenomenon known as electro-hydrodynamic flow.

Electro-hydrodynamic flow (EHDF) is a form of local and/or global turbulence (within a pixel or a capsule) that arises under the influence of an externally applied electric field. It has been observed by the inventors that EHDF is often unstable, random and non-linear in nature, thereby causing the particle trajectories to deviate substantially from the intended particles trajectory. It may therefore be understood that the heavily disturbed particle trajectories lead to irreproducibility in the greyscale, in turn causing visible color non-uniformity, both across the display as well as from pixel to pixel.

One solution to the problem is to drive the electrophoretic display at low or very low drive fields at the expense of the image update speed. However, unacceptably long update times result. There is therefore a need to provide more reliably repeatable grey levels for an electrophoretic display, and at higher drive voltages, and this can then enable an increase in the number of grey levels.

According to the invention, there is provided a method of driving an electronic device comprising one or more device elements, the or each device element comprising particles which are moved to control a device element state, and the or each device element comprising a collector electrode, and an output electrode, wherein the method comprises:

in a reset phase, applying a first set of control signals to control the device to move the particles to a reset electrode; and in an addressing phase, applying a second set of control signals to control the device to move the particles from the reset electrode such that a desired number of particles are at the output electrode, wherein the second set of control signals comprises a pulse waveform oscillating between first and second voltages in which the first voltage is for attracting the particles to the reset electrode and the second voltage is for attracting the particles from the reset electrode to the output electrode, and wherein the duty cycle and the magnitude of the first and second voltage of the pulse waveform determines the proportion of particles transferred to the output electrode in the addressing phase.

This control method provides well-controlled "packets of particles" at the reset electrode before being passed on, in part, towards the output electrode This method can be used for particles with or without threshold. The reset electrode may comprise one of the collector electrode and output electrode.

For particles having a threshold, one of the first and second voltages can be below the threshold and the other of the first and second voltages can be above the threshold. The first voltage of the pulse waveform may have the magnitude above the threshold value, whilst the second voltage may have the magnitude of the voltage below the threshold value. Both voltages may be above the threshold. Thus it may be understood that the pigment packages can be displaced in one direction only, or in both directions.

For particles with no threshold each device element preferably further comprises a gate electrode, and the reset electrode comprises one of the collector electrode, output electrode and the gate electrode. In this case, the packets of particles are passed between the reset electrode and the output electrode via the gate electrode. The transfer of particles for particles having no threshold is only for a duty-cycle controlled period of time during the device element addressing cycle. For devices utilizing particles having no threshold the impact of EHDF is interrupted by means "wave breaking".

In all cases the particle quantity defines an element state, for example for display applications, this method provides repeatable and accurately controllable grey levels. In particular, the drive method can be considered to suppress the impact of EHDF by interrupting the flow.

For an arrangement with a gate electrode, when the first voltage of the pulse waveform is applied, the gate electrode can prevent movement of particles from the output electrode to the reset electrode, so that particles already at the output electrode are held there. When the second voltage of the pulse waveform is applied, the gate electrode can allow movement of particles from the reset electrode to the output electrode. In this way, the gate electrode acts an interrupt device, which allows particles to move from the reset electrode to the output electrode during one phase, and then interrupts the particle movement in the other phase to send particles back to the reset electrode which have not reached the output electrode. The gate electrode is preferably between the reset electrode and the output electrode for this purpose.

The method may further comprise an evolution phase, in which a third set of control signals is applied to control the device to spread the particles collected at the output electrode across an output area of the device element. In this way, the output electrode may be a temporary storage electrode. The evolution phase can be in parallel for all device elements, so that a rapid addressing scheme is formed, with most of the particle movement being performed in parallel.

The method may be for driving an electrophoretic display, for example an in-plane electrophoretic display device, wherein each device element comprises an electrophoretic display pixel. The gate electrode is preferably positioned symmetrically between the collector electrode and the output electrode.

The reset electrode may comprise the collector electrode. In this case, and for an arrangement with a gate electrode, the second set of control signals comprises a first gate voltage for device elements for which the transfer of particles from the collector electrode to the output electrode is to be controlled and a second gate voltage for device elements for which the transfer of particles from the collector electrode to the output electrode is locked. Thus, in a row-by-row addressing sequence, for an addressed row, the first gate voltage can be applied and for a non-addressed row the second gate voltage can be applied.

For an addressed row, the first and/or second voltages of the pulse waveform may be at different levels for different device elements in the same row. This can enable different particle movement in different elements to be controlled by drive signals with the same duty cycle, thereby simplifying the drive electronics.

The reset electrode may also not be the same electrode for different device elements. In this way, particle movement can be towards the output area of one pixel, and away from the output area for another pixel, in the same row. The only difference between the two operations is the value of the duty-cycle of the pulse train, which may also be combined with different magnitudes and sub-periods per addressing period.

The method can be used to drive an active matrix device, wherein the or each device element is driven in a plurality of cycles, the cycles together defining the pulse waveform oscillating between the first and second voltages.

The invention also provides an electrophoretic device, comprising an array of rows and columns of device elements, and a controller for controlling the device, wherein the controller is adapted to implement the method of the invention. The device preferably comprises a display device.

The invention also provides a display controller for an electrophoretic display device, adapted to implement the method of the invention.

BRIEF DESCRIPTION OF THE DRAWINGS

Examples of the invention will now be described in detail with reference to the accompanying drawings, in which.

Figure 1:
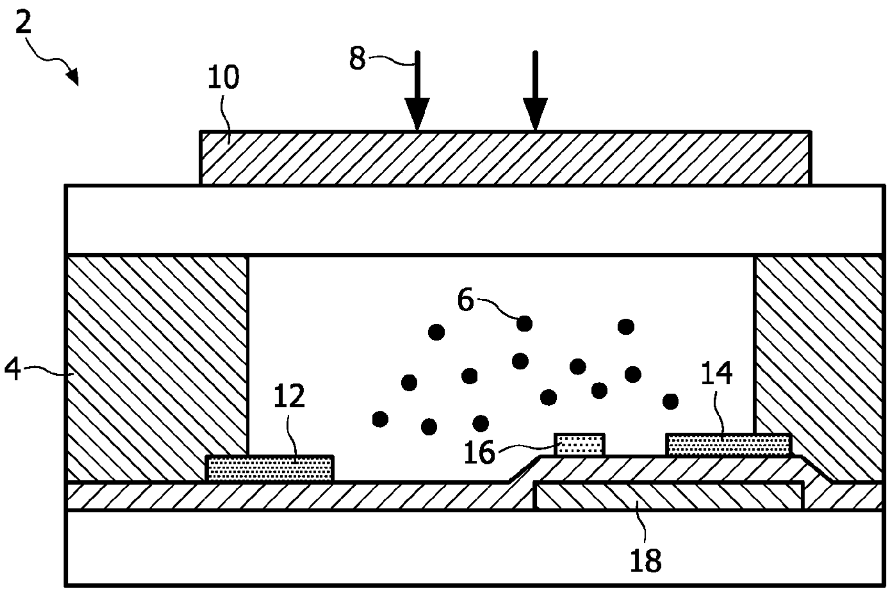
FIG. 1 shows schematically one known type of device to explain the basic technology.

It should be noted that these figures are diagrammatic and not drawn to scale. Relative dimensions and proportions of parts of these figures have been shown exaggerated or reduced in size, for the sake of clarity and convenience in the drawings. The same references are used in different Figures to denote the same layers or components, and description is not repeated.

DETAILED DESCRIPTION OF THE EMBODIMENTS

The invention provides a drive scheme by which the pixel writing comprises repetitively modulating a drive electrode between a pixel-write and a pixel non-write state for a given period of time, thereby enabling the writing of different greyscales for different pixels, with the greyscale per pixel corresponding to the duty-cycle (percentage pixel write vs. pixel non-write) of the repetitive pulses during the row or line addressing time. In this way, even for a passive matrix addressed display, accurate, uniform and reproducible greyscales can be generated, and ensured.

Before describing the invention in more detail, one example of the type of display device to which the invention can be applied will be described briefly.

FIG. 1 shows an example of the type of display device 2 which will be used to explain the invention, and shows one electrophoretic display cell of an in-plane switching passive matrix transmissive display device.

The cell is bounded by side walls 4 to define a cell volume in which the electrophoretic ink particles 6 are housed. The example of FIG. 1 is an in-plane switching transmissive pixel layout, with illumination 8 from a light source (not shown), and through a color filter 10.

The particle position within the cell is controlled by an electrode arrangement comprising a common electrode 12, a storage electrode 14 which is driven by a column conductor and a gate electrode 16 which is driven by a row conductor. Optionally the pixels may comprise one or more additional control electrodes, for example positioned between the common and gate electrode in order to further control the movement of the particles in the cell.

The relative voltages on the electrodes 12, 14 and 16 determine whether the particles move under electrostatic forces to the storage electrode 14 or the drive electrode 12.

The storage electrode 14 (also known as a collector) defines a region in which the particles are hidden from view, by a light shield 18. With the particles over the storage electrode 14, the pixel is in an optically transmissive state allowing the illumination 8 to pass to the viewer on the opposite side of the display, and the pixel aperture is defined by the size of the light transmission opening relative to the overall pixel dimension. Optionally, the display could be a reflective device with the light source being replaced by a reflective surface.

In a reset phase, the particles are collected at the storage electrode 14, although a reset phase may be to the first pixel electrode, or the gate electrode.

The addressing of the display involves driving the particles towards the electrode 12 so that they are spread within the pixel viewing area.

FIG. 1 shows a pixel with three electrodes, and the gate electrode 16 enables independent control of each pixel using a passive matrix addressing scheme.

Figure 2:
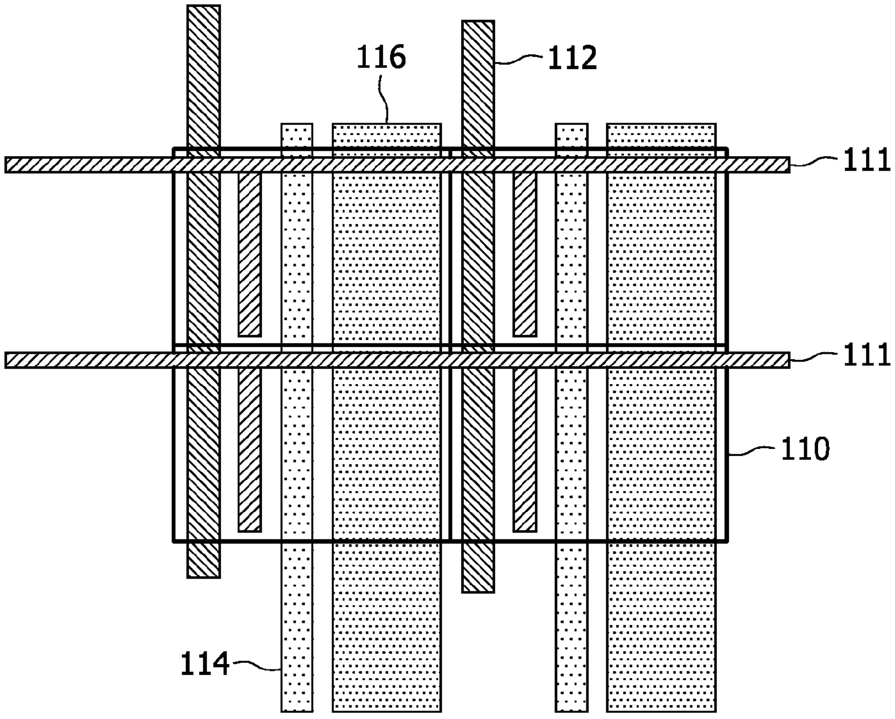
FIG. 2 shows one example of pixel electrode layout.

More complicated pixel electrode designs are possible, and FIG. 2 is one example.

As shown in FIG. 2, each pixel 110 has four electrodes. Two of these are for uniquely identifying each pixel, in the form of a row select line electrode 111 and a write column electrode 112. In addition, there is a temporary storage electrode 114 and the pixel electrode 116.

In this design, the pixel is again designed to provide movement of particles between the vicinity of the control electrodes 111, 112 and the pixel electrodes 116, but an intermediate electrode 114 is provided, which acts as a temporary storage reservoir. This allows the transfer distance during the line-by-line addressing to be reduced, and the larger transfer distance from the temporary electrode 114 to the pixel electrodes 116 can be performed in parallel. FIG. 2 shows the pixel areas as 110.

The addressing period can thus proceed faster, due to the fact that the distance to travel is reduced and the particle velocity is increased due to increased electric field.

Other electrode designs and drive schemes are also possible.

Figure 3:
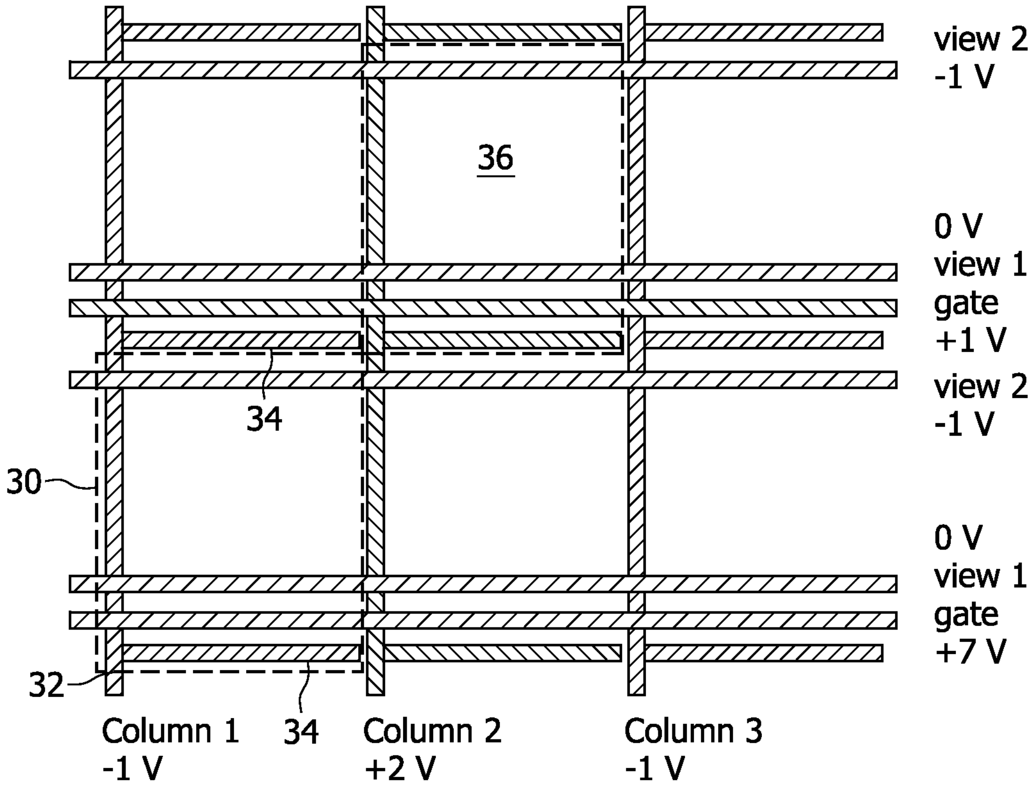
FIG. 3 shows another example of pixel electrode layout.

FIG. 3 shows a similar electrode layout to FIG. 2 and with voltages shown indicating the drive levels for a pigment having a positive sign. Similar potentials may be applied to an active matrix driven device.

In FIG. 3, each pixel 30 is associated with one column line 32 which connects to a collector electrode spur 34 and two row lines (view1 and view2). The gate lines also run in the row direction, and the view1 and view2 electrodes are common electrodes for the whole display.

The term "select" is used to denote a row of pixels which is being addressed, and the term "write" is used to denote a pixel within the row which is to have its particles to transit towards the viewing area.

The top middle pixel 36 in FIG. 3 is a select-write pixel (one in an addressed row and being driven with particles in the viewing area), and pigments for this pixel are allowed to cross the gate (at +1 V) from the collector electrode (at +2 V) towards the first display electrode (View1 at 0 V). For all other pixels in the same column, for which the gates are "high" (+7 V), pigments cannot cross the gate, whilst in addition for the other pixels in the same row, the collectors are "lower" (−1 V) than the gate (+1 V). Thus, for these pixels the pigments are held at the collectors.

Figure 4:
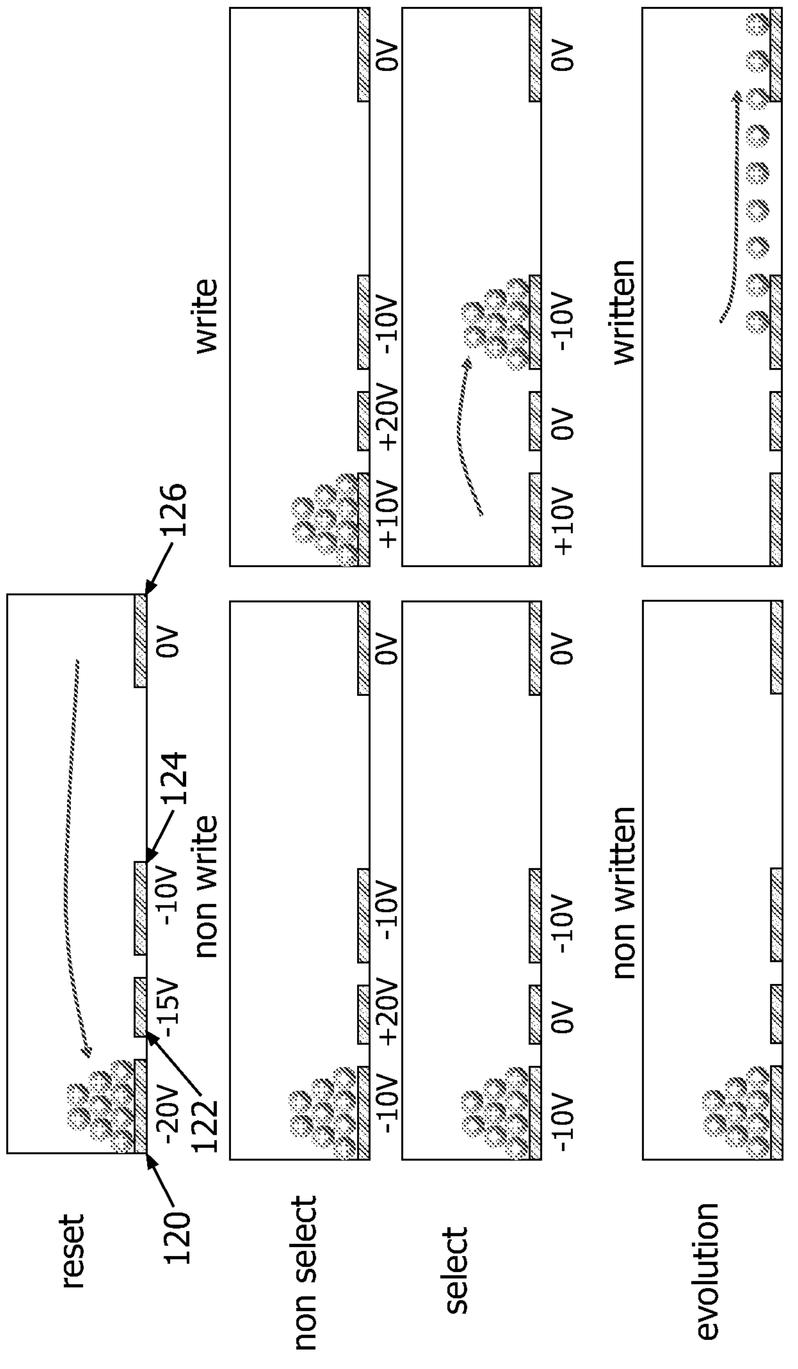
FIG. 4 shows how the layout of FIG. 2 is driven.

FIG. 4 is used to explain graphically the operation explained above with reference to FIG. 3. There is a collector electrode 120, a gate electrode 122, and two pixel electrodes 124, 126. The first of these 124 can be considered as a temporary storage electrode.

The right column of images shows the sequence of voltages for a pixel which has its particles driven into the viewing area (write pixels), and the left column of images shows the sequence of voltages for a pixel to remain with particles in the collector area (non-write pixel).

First, in the reset phase the particles (assumed to be positively charged) are all drawn to the collector electrode 120, for all pixels simultaneously.

FIG. 4 shows different voltages to achieve the same outcome as FIG. 3 to illustrate that different voltage levels can be used.

A row at a time, each row is selected by lowering the gate voltage compared to row which is not selected. In the example shown, the selected row ("select") has a gate voltage of 0 V whereas the non-selected row ("non select") has a gate voltage of +20 V. The pixel which is not to be written has a collector voltage of −10 V and the pixel to be written has a collector voltage of +10 V. As shown schematically, only the pixel to be written and in a selected row has particle movement towards the first pixel electrode 124, acting as a temporary storage electrode. It is also possible to set the voltage of the second pixel electrode 126 lower than the first, in which case the particles will be transported further towards the second pixel electrode 126.

The full display is addressed in this way.

In the following evolution phase, for all pixels simultaneously, the particles that are written to the first pixel electrode 124 (or alternatively the second pixel electrode 126) are spread between the two pixel electrodes, as schematically shown.

This invention relates to methods to ensure reproducible and accurate greyscale generation, particularly for these types of in-plane moving particle devices.

The advantages of the invention will be illustrated with reference to the passive matrix in-plane switching electrophoretic display of FIGS. 2 to 4, namely having at least one collector electrode, at least one display electrode, and at least one gate electrode, per pixel, with the gate electrode being substantially located between the first collector electrode and the first display electrode.

A number of different examples of the invention will be described for realizing accurate and reproducible greyscales in passive matrix driven in-plane switching electrophoretic displays. The voltage values and relative dimensions indicated in the drawings are purely as an example. The term particle should be understood to include a pigment or a dye colored material in the form of a liquid or solid or even combinations thereof, and these can be either colored during formation of the particles or during post-treatment thereof. This yields a small-sized colored particle, or a colored liquid droplet for example dyed or stained otherwise, suspended in another liquid (e.g. oil-in-oil emulsions, or so-called continuous phase fluids). Instead of being colored, the particles may be a material having a refractive index other than that of the suspending medium (for example for switchable lenses).

Figure 5:
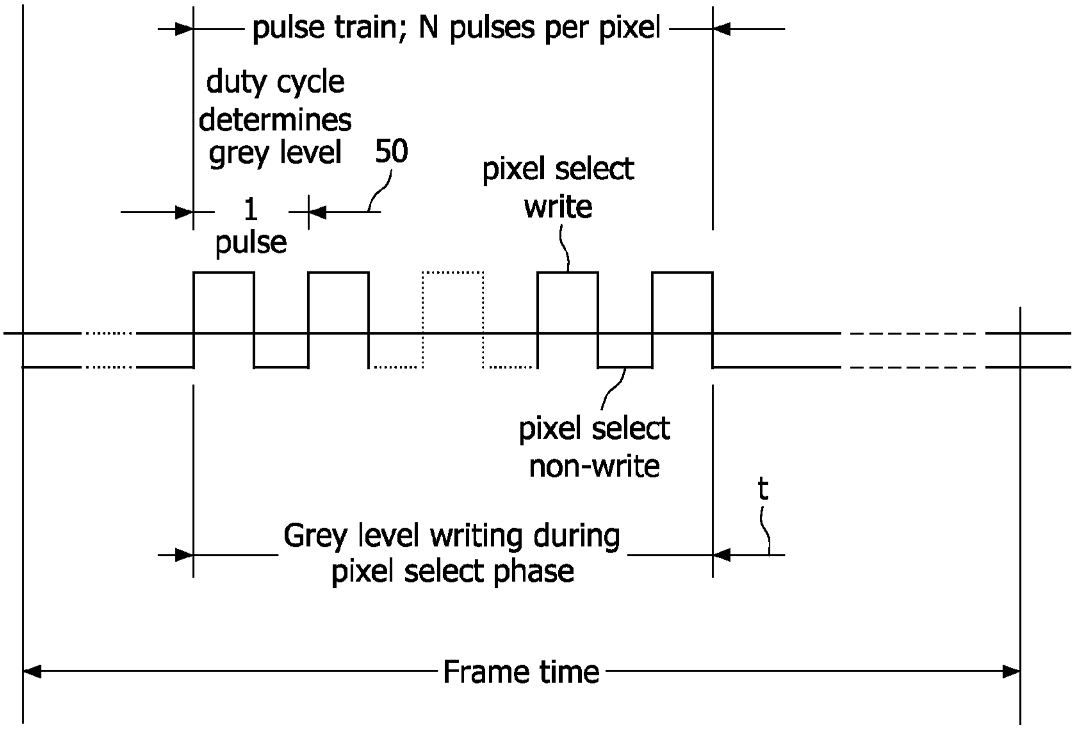
FIG. 5 shows a drive voltage used in the method of the invention.

In a first embodiment of the invention, rather than applying a stationary potential to the collector electrodes for a select-write pixel or row, the potential at the collector (column) of the select-write pixel or row is modulated with a repetitive cycle as shown in FIG. 5 between a pixel-write and a pixel non-write state.

FIG. 5 shows the pixel writing phase having time duration t, and this is the time during which there is particle movement to the temporary storage electrode, namely the particle movement shown in the select-write part of FIG. 4. This time period t comprises a series of N pulses on the collector electrode between the write and non-write voltages, namely +10 V and −10 V taking the example voltages in FIG. 4, or +2 V and −1 V taking the example voltages in FIG. 3. For each pulse 50, the duty cycle determines the grey level. This duty cycle corresponds to the duty cycle for the full period of time (t) and determines the grey-level. Thus, different grey-levels (for example 255 for 8 bits) can be written for different pixels across a row during a single row addressing cycle.

The effect of the alternating pixel-select write and pixel-select non-write states is that rolling vortices initially are set-up along the electrode edges of the collector, gate and view1 electrode, and that they are allowed to evolve to their full strength. Only the vortex running along the collector electrode is "loaded" with a well-defined amount of pigment particles. Taking the example voltages in FIG. 3, the collector potential is next raised from −1 V to +2 V at a time according to the selected duty-cycle. Relative to the gate at +1 V this implies that charge carriers of the other sign are attracted, and thus in effect the rolling vortex at the gate electrode and at the collector electrode is broken down, albeit temporarily. In turn, the pigments in the rolling vortex are forwarded to the gate, and in well-defined amounts, from where they can be displaced towards the view1 electrode.

The displacement towards the view1 electrode will happen for both a "low" and a "high" collector state. The only requirement is that the pigments should have crossed the gate, which takes time.

Thus, it can be seen that the oscillating signal causes the breakdown of the flow patterns, and the gate electrode acts as a divider, which splits the flow patterns when the voltages are oscillated, with particles on opposite sides of the gate electrode being attracted in opposite directions.

At the same time as the collector electrode voltage is raised, the rolling vortex is slightly displaced towards the gate electrode before it breaks down completely. Thus for a higher resistivity suspension, pigments may cross the gate before a new vortex arises along the edge of the collector electrode, whilst for a lower resistivity suspension it takes more time to achieve the same effect.

Next, when the potential at the collector is re-adjusted to −1 V after a further period according to the duty-cycle of a single pulse, the pigments that are located in the gap between the collector and the gate electrode will return to the collector electrode, at which time is given for a new vortex to be set-up, and to be "reloaded" with pigment particles, whilst the pigments between the gate and the first display electrode are displaced more and more towards the first display electrode. Thus, by repeating a duty cycle sequence a number of times (N) during a pixel-select write phase of duration t, depending upon the duty-cycle of the non-write/write period, a given greyscale can be written.

This drive sequence means that it will take the pigment (having a certain effective mobility) time to cross the gap between the collector and the view1 electrode. Thus depending upon the effective mobility of the pigment in the gap and the drive field, the actual electrode gap, the "frequency" at which the non-write (−1 V) and write (+2 V) periods are toggled may be different, or the total time during which a pixel is selected (time) may be shortened or enlarged, or the drive voltages may be adjusted (−1 V vs. +4 V or −1 V vs. +6 V or −10 V vs. +10 V as in FIG. 5).

In this drive scheme, just after some of the pigments have reached the first output electrode, having crossed the gate, the pigments which are still between the collector and the first output electrode are subsequently re-attracted towards the collector electrode, by reversing the sign of the potential at the collector temporarily (accordingly to the duty-cycle). Thus the initial pigment portion between the collector and the first output electrodes becomes broken up, where one part "escapes" towards the viewing area (i.e. the first output electrode), whilst the other part is re-attracted towards the collector electrode, forming a new packet.

This process is repeated N times. Thus, in essence pigment packets are repetitively forwarded in small and well-controlled amounts from the collector electrode towards the first output electrode (or vice versa if pigments are being extracted in a controlled way from the viewing area). The unstable effects of the EHDF are suppressed by means of duty cycle controlled "wave-breaking".

As will be apparent from the examples below, different greyscales can be set based on frequency, voltage levels and/or signs, as well as duty cycles. The invention can be used to generate a large number of different, accurate, and reproducible greyscales. The number of greyscales may then be limited by the number of perceived luminance values that can be differentiated by the human-eye, rather than by the repeatability of particle movement. The limitation may then be the optical density of the suspension. A higher number of greyscales may thus be possible for suspensions having a larger optical density, or a reflective surface having a larger reflectivity, or a pixel having a larger aperture.

Although there are many different variations, it is preferred that for a duty cycle of 50%, no pigment or hardly any pigment ends up in the viewing area (because it is able to cross the gate). Hence, in the optimal situation, the duration of one pulse (t/N) equals the total time that is required to "pump" a pigment packet back and forward at the gate electrode. In other words, at 50% duty-cycle pigments are at the verge of crossing the gate, but are not able to do so. How long this time is exactly does not only depend on the field applied, but also on the width of the gate electrode in relation to the effective mobility of the pigment particles at the gate, surface charges and their sign, and other factors affecting the local electrostatic field.

For duty-cycles near 100% (or near 0% again depending on the sign of the pigment and whether it is collected at the collector or at the view1 electrode) hardly any pigment is swept back to/from the collector. Thus the intensity of the dark/white state will rise/drop only slowly to its maximum value.

Figure 6:
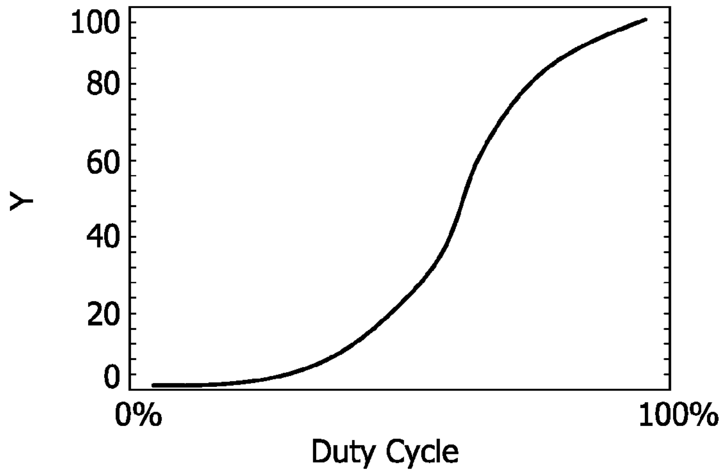
FIG. 6 is used to explain how the drive voltage of FIG. 5 functions.

FIG. 6 shows the duty cycle level versus the pixel output Y. A Y value of 0 means maximum absorption, i.e. all particles spread in the viewing area, and a Y value of 100 means minimum absorption, i.e. all particles held in the collector.

In a second embodiment, instead of resetting the pigments to the collector electrode, the pigments can be reset to the first display electrode (view1), namely the display electrode nearest to the gate electrode. Pigments can then be extracted in small and controlled packets towards the collector electrode by using the modulation scheme described above applied to either the collector, or the view1 electrode.

In the latter case, for the non-write pixels the collector potential is repelling, whilst for the pixel-select pixel-write case the collector potential is attracting. Thus after removal of the desired amount of pigment, the display common evolution phase again follows as described above.

In a third embodiment, rather than having a constant addressing period per pixel and a variable duty-cycle, a fixed duty-cycle can be applied for a variable amount of time whilst applying different potentials, or signs, to the collector electrodes, thereby again resulting in well defined and accurate grey-scales. This method can be very well suited for low greyscales numbers (for example 2 or 3 bit).

In a fourth embodiment, both the duty-cycle and the addressing time per pixel are variable, and different combinations of drive scheme can be applied at different times.

In a fifth embodiment, different potentials can be applied to the collector electrodes of different pixels during different times of the pixel-write and/or pixel non-write period, for example for a subset n of the N duty-cycle periods.

Combinations of the different concepts outlined above may be applied at different times, and for different (equal or non-equal) sub-periods of time during the row addressing period (t).

Figure 7:
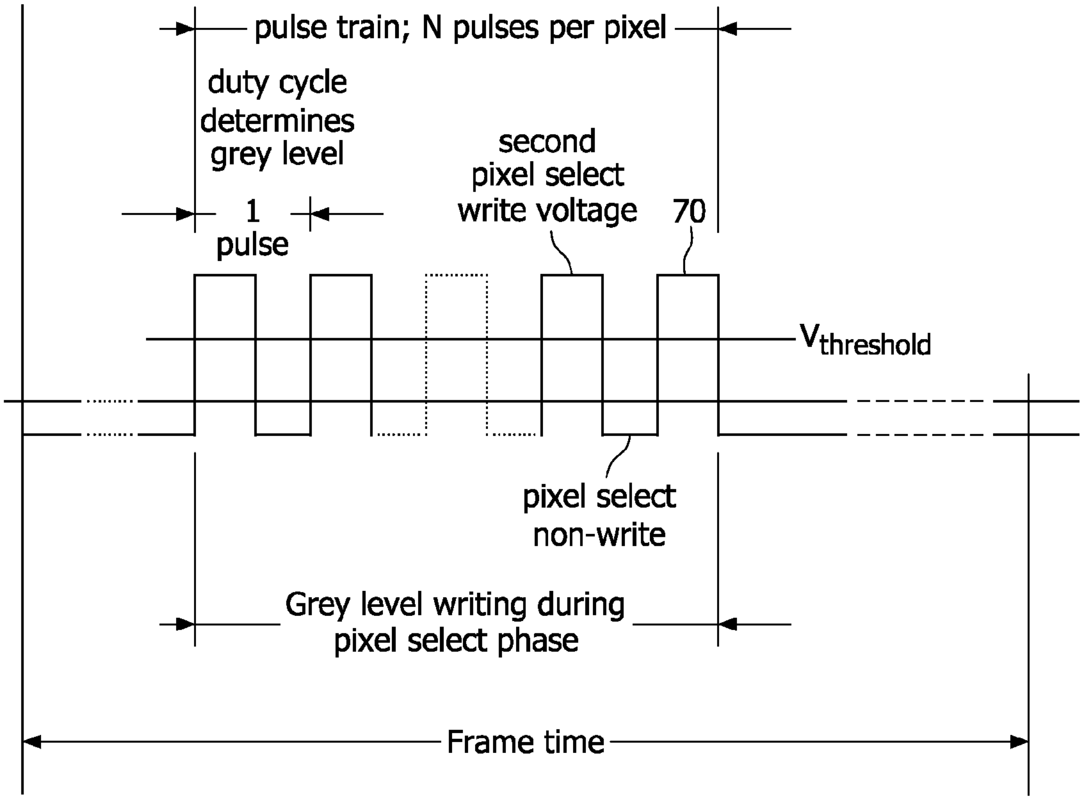
FIG. 7 shows a second drive voltage used in the method of the invention.

When a row is selected, the required column (collector) voltages are typically applied to the column conductors in parallel. This requires each column to have an independently controlled duty cycle. However, it may be possible to use the same duty cycle for different columns but with different write voltages to achieve different grey levels. This can simplify the drive electronics by having a set of required duty cycles. FIG. 7 shows a column voltage for a different pixel in a selected row to the pixel driven by the voltage waveform of FIG. 5, and uses a second pixel select write voltage 70 different to that shown in FIG. 5.

FIG. 7 also shows that for a case in which the particles have threshold (and no gate electrode is needed), the threshold voltage Vthreshold can be selected so that the "pixel select write" voltage is above threshold and the "pixel select non-write" is below threshold.

The examples above use gate electrodes to enable independent addressing of pixels. It is known that passive matrix schemes can use a threshold voltage response to allow the addressing of one row of pixels not to influence the other rows that have already been addressed. In such a case, the combination of row and column voltages is such that the threshold is only exceeded at the pixels being addressed, and all other pixels can be held in their previous state. The invention can also be applied to display devices using a threshold response as part of a matrix addressing scheme. This may be instead of or as well as the use of gate electrodes as described above. The invention is of most benefit to in-plane switching display technologies.

For active matrix devices, the same drive pulses can be used, either for designs with or without a gate, and with designs having one or more thin-film transistors (TFTs) per pixel, or even having "in-pixel logic".

Typically, the active matrix comprises an array of TFTs, having their gates connected to row conductors, and their sources connected to column conductors. The drain of each TFT is then coupled to the collector electrode.

Figure 8:
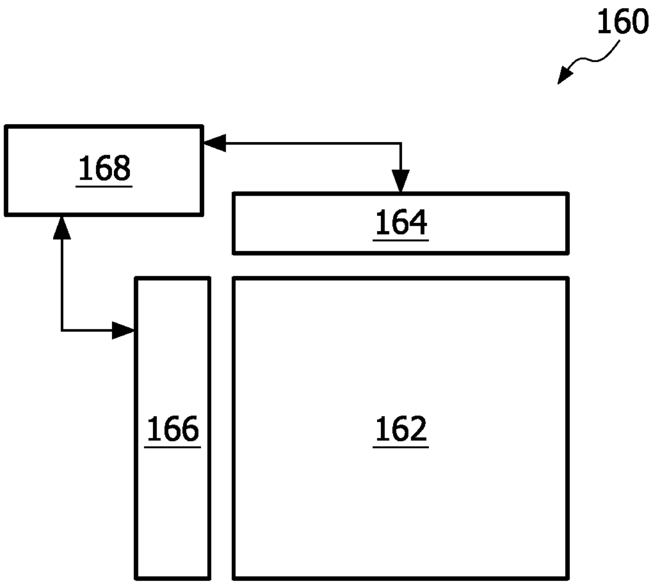
FIG. 8 shows a display device of the invention.

FIG. 8 shows schematically that the display 160 of the invention can be implemented as a display panel 162 having an array of pixels, a row driver 164, a column driver 166 and a controller 168. The controller implements the multiple addressing scheme and is one example can implement different drive schemes according to a target line time for the first addressing cycle.

In the case of an active matrix device, the row driver is a gate driver, for example a simple shift register which addresses the gates of one row of TFTs at a time. The column driver switches each column to the appropriate voltage for that column for the selected row of pixels.

If there are G different duty cycle levels, the addressing phase has a number G of addressing cycles. For example if there are 8 duty cycles, then 8 addressing cycles enable each pixel to be driven to any of the 8 duty cycles. This effectively builds up a signal having a variable duty cycle signal in a number of discrete steps. The variable duty cycle signal has a period corresponding to the full addressing phase, and the step in the signal from one voltage to another is at one of the shorter addressing cycle timing points. If there is a constant time T between each addressing cycle, and the signal has M repeats of the duty cycle, then the total write phase has a length G×T×M. Each row in the array is addressed G×M times. The invention can thus be applied to an active matrix display device to provide the same advantages for the passive matrix version.

The invention can be applied to many other pixel layouts, and is not limited to electrophoretic displays or to passive matrix displays. The invention is of particular interest for passive matrix displays as these have long addressing times, but advantages can also be obtained for active matrix displays. There may be one output electrode or two, as in the examples above.

In the case of active matrix applications, the same or similar modulation methods may be used for all pixels simultaneously. If the electrophoretic suspension contains particles having bi-stability, and/or a threshold, the gate electrodes in those cases may be omitted, for example to give a larger aperture.

The drive methods of the invention may also be used for out-of-plane switching and mixed mode displays, again in order to control EHDF. During the pixel (or row) addressing period, particles may be repetitively displaced in- and/or out-of-plane at different ratios which are duty-cycle determined. Thus the optical appearance of the near stationary layer at the viewer's side may be controlled better when compared to the conventional methods used, or may first be controlled in-plane before being redirected out-of-plane.

More generally, the invention can be applied to electronic paper displays, electronic price tags, electronic shelf labels, electronic billboards, sun-blinds and moving particle devices in general.

Non-display applications include lenses and lens-arrays, biomedical devices and dose trimming devices, visible and invisible light shutters (IR shutters in windows for housing/green houses, swimming pools), switchable color filters (photography), lighting applications (lamps and pixelated-lamps), electronic floors, walls, ceilings and furniture, electronic coatings in general (for example car "paint"), and active/dynamic camouflage (either visible and/or invisible including LF, HF, UHF, SHF radio-waves and higher frequency waves (light/X-ray blockers/absorbers/modulators).

In the case of a lens application, an array of lenses or lens cups can be provided with each cup having a different and adjustable (average) index of refraction, either locally or global, either microscopic (near electrodes only) or macroscopic (throughout the "pixel"/lens-cup).

The approach can be applied for electrophoretic suspensions containing particles that do not possess bi-stability and/or threshold. The invention of course can be applied to positive as well as negative charged pigments.

Both low and high resistivity suspensions can be used, although lower resistivity suspensions require much lower drive fields when compared to higher resistivity suspensions (for which EHDF is easier to control), and thus lower resistivity suspensions suffer from substantially increased image update times when addressed in a passive matrix scheme.

The device may have a single element, for example for a switchable window, whereas for display applications, there will be an array of pixels.

While the invention has been illustrated and described in detail in the drawings and foregoing description, such illustration and description are to be considered illustrative or exemplary and not restrictive; the inventions is not limited to the disclosed embodiments. Variations to the disclosed embodiments can be understood and effected by those skilled in the art in practicing the claimed invention, from a study of the drawings, the disclosure, and the appended claims. In the claims, the word "comprising" does not exclude other elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method of driving an electronic device, the method comprising acts of:

providing one or more device elements, each device element having a volume defined by side walls for housing a plurality of particles, a plurality of electrodes including collector and output type electrodes, and a reset surface selectable from all included electrode types;

in a reset phase applying a first set of control signals thereby moving the particles to the reset surface; and in an addressing phase applying a second set of control signals thereby moving a desired number of particles from the reset surface to the output type electrode, the second set of control signals using a pulse waveform oscillating between first and second voltages in which the first voltage is for attracting the particles to the reset surface and the second voltage is for attracting the particles from the reset surface to the output type electrode, a duty cycle and a magnitude of the first and second voltage determines a proportion of particles transferred to the output type electrode.

2. The method as claimed in claim 1 wherein the plurality of particles have a threshold, and one of the first and second voltages is below the threshold and the other of the first and second voltages is above the threshold.

3. The method as claimed in claim 1, wherein the plurality of electrodes further comprises a gate type electrode.

4. The method as claimed in claim 3, wherein when the first voltage of the pulse waveform is applied, the gate type electrode prevents movement of particles from the output type electrode to the reset surface, so that particles already at the output type electrode are held there.

5. The method as claimed in claim 3, wherein when the second voltage of the pulse waveform is applied, the gate type electrode allows movement of particles from the reset surface to the output type electrode.

6. The method as claimed in claim 3, wherein the gate electrode type is positioned symmetrically between the collector type electrode and the output type electrode.

7. The method as claimed in claim 3, wherein the reset surface comprises the collector type electrode.

8. The method as claimed in claim 7, wherein the second set of control signals comprises a first gate voltage for device elements for which the transfer of particles from the collector type electrode to the output type electrode is to be controlled and a second gate voltage for device elements for which the transfer of particles from the collector type electrode to the output type electrode is locked.

9. The method as claimed in claim 8, wherein the addressing phase comprises row-by-row addressing of the device elements, wherein for an addressed row, the first gate voltage is applied and for a non-addressed row the second gate voltage is applied.

10. The method as claimed in claim 9, wherein for an addressed row, the first and/or second voltages may be at different levels for different device elements in the row.

11. The method as claimed in claim 10, wherein different device elements in the row have the same duty cycle.

12. The method as claimed in claim 1, wherein each device element is driven in a plurality of cycles, the cycles together defining the pulse waveform oscillating between the first and second voltages.

13. The method as claimed in claim 1, wherein the method further comprises an act of applying a third set of control signals to spread the particles collected at the output type electrode across an output area of the device element.

14. The method as claimed in claim 1, wherein each device element comprises an electrophoretic display pixel.

15. The method as claimed in claim 1, for driving an in-plane electrophoretic display device.

16. An electrophoretic device, comprising:

an array of rows and columns of device elements, each device element having a volume defined by side was for housing a plurality of particles, a plurality of electrodes including collector and output electrode types, and a reset surface selected from all included electrode types; and a controller for in a reset phase applying a first set of control signals thereby moving the particles to the reset surface, and in an addressing phase applying a second set of control signals thereby moving a desired number of particles from the reset surface to the output type electrode, the second set of control signals using a pulse waveform oscillating between first and second voltages in which the first voltage is for attracting the particles to the reset surface and the second voltage is for attracting the particles from the reset surface to the output type electrode, a duty cycle and a magnitude of the first and second voltage determines a proportion of particles transferred to the output type electrode.

17. The electrophoretic device as claimed in claim 16, further comprising a display device.

18. A display controller for controlling at least one electrophoretic display device, comprising:

an array of rows and columns of device elements, each device element having a volume defined by side walls for housing a plurality of particles, a plurality of electrodes including collector and output electrode types, and a reset surface selected from all included electrode types;

the controller:

in a reset phase applying a first set of control signals thereby moving the particles to the reset surface, and in an addressing phase applying a second set of control signals thereby moving a desired number of particles from the reset surface to the output type electrode, the second set of control signals using a pulse waveform oscillating between first and second voltages in which the first voltage is for attracting the particles to the reset surface and the second voltage is for attracting the particles from the reset surface to the output type electrode, a duty cycle and a magnitude of the first and second voltage determines a proportion of particles transferred to the output type electrode.

* * * * *